(12) United States Patent
Kim et al.

(10) Patent No.: US 11,701,944 B2
(45) Date of Patent: Jul. 18, 2023

(54) AIR CONDITIONER FOR VEHICLE

(71) Applicant: Hanon Systems, Daejeon (KR)

(72) Inventors: Yong Ho Kim, Daejeon (KR); Hak Kyu Kim, Daejeon (KR); Sae Dong Eom, Daejeon (KR); Seung Kyu Oh, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 17/690,046

(22) Filed: Mar. 9, 2022

(65) Prior Publication Data

US 2022/0194162 A1   Jun. 23, 2022

Related U.S. Application Data

(62) Division of application No. 16/359,322, filed on Mar. 20, 2019, now Pat. No. 11,299,005.

(30) Foreign Application Priority Data

Mar. 22, 2018 (KR) .................. 10-2018-0033203
Feb. 20, 2019 (KR) .................. 10-2019-0019982

(51) Int. Cl.
*B60H 1/00* (2006.01)
*B60H 1/24* (2006.01)

(52) U.S. Cl.
CPC ......... *B60H 1/00064* (2013.01); *B60H 1/246* (2013.01); *B60H 1/0005* (2013.01);
(Continued)

(58) Field of Classification Search
CPC ............ B60H 1/00046; B60H 1/00064; B60H 1/264; B60H 1/00028; B60H 1/0005;
(Continued)

(56) References Cited

U.S. PATENT DOCUMENTS 3,948,312 A * 4/1976 Nisbet .................. F24F 11/30
165/204
4,383,642 A * 5/1983 Sumikawa ......... B60H 1/00678
237/12.3 A
(Continued)

FOREIGN PATENT DOCUMENTS

DE         10037384 A1    2/2002
DE     102007049338 A1    4/2009
(Continued)

*Primary Examiner* — Joel M Attey
(74) *Attorney, Agent, or Firm* — Norton Rose Fulbright US LLP; James R. Crawford

(57) ABSTRACT

The present invention relates to an air conditioner for a vehicle, which can remarkably improve resistance against an air flow in an air passageway, thereby enhancing efficiency. The air conditioner for a vehicle includes: a case having an air inlet, an air outlet, and an air passageway formed therein; a blower unit for blowing air to the air inlet; and a cooling means and a heating means disposed in the air passageway of the case in an air flow direction in order, wherein the air outlet of the case includes a floor outlet and vent outlets, the floor outlet and the vent outlets are arranged below the heating means in a height direction, and the floor outlet is arranged within a range of the width of the heating means.

6 Claims, 9 Drawing Sheets

(52) U.S. Cl.
CPC ...... *B60H 1/00028* (2013.01); *B60H 1/00528* (2013.01); *B60H 1/00564* (2013.01); *B60H 1/00678* (2013.01); *B60H 1/00842* (2013.01); *B60H 1/242* (2013.01); *B60H 2001/00135* (2013.01); *B60H 2001/00185* (2013.01); *B60H 2001/00242* (2013.01)

(58) Field of Classification Search
CPC ............ B60H 1/00528; B60H 1/00564; B60H 1/00678; B60H 1/00842; B60H 1/242; B60H 2001/00135; B60H 2001/00185; B60H 2001/00242
USPC .......................................................... 165/42
See application file for complete search history.

(56) References Cited

U.S. PATENT DOCUMENTS

| | | | |
|---|---|---|---|
| 6,092,592 A * | 7/2000 | Toyoshima | B60H 1/0005 454/126 |
| 2003/0205370 A1 | 11/2003 | Kim | |
| 2016/0152110 A1* | 6/2016 | Kim | B60H 1/0005 165/203 |
| 2018/0141404 A1 | 5/2018 | Yeon | |
| 2018/0162192 A1 | 6/2018 | Lee et al. | |

FOREIGN PATENT DOCUMENTS

| | | |
|---|---|---|
| DE | 102007049340 A1 | 4/2009 |
| KR | 20120138928 A | 12/2012 |
| KR | 20130124683 A | 11/2013 |

* cited by examiner

PRIOR ART

PRIOR ART

AIR CONDITIONER FOR VEHICLE

The present application is a divisional application of U.S. patent application Ser. No. 16/359,322 filed Mar. 20, 2019, which claims priority from Korean Patent Application Nos. 10-2018-0033203 filed Mar. 22, 2018 and 10-2019-0019982 filed Feb. 20, 2019, the entire contents of each of which is incorporated herein by reference in its entirety.

BACKGROUND OF THE INVENTION

Field of the Invention

The present invention relates to an air conditioner for a vehicle, and more particularly, to an air conditioner for a vehicle, which is installed at a rear seat of the vehicle to air-condition the rear seat of the vehicle independently from a front air conditioner for a vehicle.

Background Art

An air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for cooling the inside of an air-conditioning case; a heater core for heating the inside of the air-conditioning case; and a mode converting door for selectively blowing the air cooled by the evaporator or heated by the heater core toward parts of the interior of the vehicle.

In case of vehicles with a wide interior space, for instance, deluxe cars, vans, or four-wheel drive vehicles commonly called "RV", the air conditioner for a vehicle does not provide sufficient cooling or heating effect to the rear seat since being formed to discharge air for cooling or heating from a vent duct mounted at an instrument panel of the front of the interior of the vehicle. In order to solve such a problem, such a vehicle with the wide interior space is equipped with a rear air conditioner installed between a side out panel and a luggage trim to assist cooling performance and heating performance to the rear seat.

FIG. 1 is a sectional view showing a conventional rear air conditioner for a vehicle. As shown in FIG. 1, the conventional rear air conditioner for a vehicle includes a blower disposed at one side. In a cooling mode, an air discharge passageway 2 in which air passing through the heater core 1 flows is closed. In a heating mode, an air discharge passageway 4 in which air passing through the evaporator 3 flows is closed. In a mixing mode, the air discharge passageway 2 near the heater core is partially opened and the air discharge passageway 4 near the evaporator is also partially opened, so that the air discharge passageways 2 and 4 communicate with each other and the air passing the evaporator 3 and the air passing the heater core 1 are mixed together. A temp door 7 rotatably mounted in the case 6 is disposed in an air passageway 5.

The conventional rear air conditioner for a vehicle can adjust temperature in a direction that the air passing the evaporator 3 and the air passing the heater core 1 are mixed well. However, because the temp door 7 serving to adjust temperature is located in the middle of the air passageway 5, the temp door 7 is vibrated and generates noise according to resistance of the air. Moreover, because the temp door 7 is located in the air passageway 5, it impedes the flow of air, so reduces air volume.

FIG. 2 is a sectional view showing another conventional rear air conditioner for a vehicle. As shown in FIG. 2, the conventional rear air conditioner for a vehicle includes a case 10. The case 10 includes: an air blowing passage 11 having indoor air and outdoor air inlets 11a and 11b formed at one end; a vent outlet 12 communicating with a vent duct for blowing air toward a roof of the vehicle from the air blowing passage 11; and a floor outlet 13 communicating with the floor duct for blowing air toward the floor of the vehicle. The case 10 has one air passageway 14 extending from the air blowing passage 11 to the vent outlet 12 and the floor outlet 13.

A blower unit 20 for forcedly introducing indoor air and outdoor air through the indoor air and outdoor air inlets 11a and 11b is mounted in the air blowing passage 11, and an evaporator 30 is vertically mounted in the air passageway 14a which is the closest to the blower unit 20. A heater core 40 is approximately vertically mounted downstream of the evaporator 30 to be spaced apart at a predetermined interval, and a warm air passageway 14b is formed at a rear portion of the heater core 40 to maintain a predetermined interval from the case 10.

A temperature adjusting door 50 is mounted between the evaporator 30 and the heater core 40 to be rotated around a shaft part 51 in order to prevent inflow of air into the heater core 40 in the cooling mode and to introduce air into the heater core 40 in the heating mode. The cooling mode, the heating mode, and the mixing mode are decided depending on the location of the temperature adjusting door 50. That is, if the temperature adjusting door 50 is rotated to the position indicated by the dotted line and closes a cold air passageway 14c, it is the heating mode. If the temperature adjusting door 50 is rotated to the position indicated by the solid line and prevents the flow of air toward the heater core 40, it is the cooling mode. If the temperature adjusting door 50 is rotated to the position indicated by the two short dash lines, it is the mixing mode.

In the mixing mode, some of cold air exchanged heat after passing through the evaporator 30 passes the heater core 40, and the rest does not pass the heater core 40 but passes the cold air passageway 14c. In this instance, warm air exchanged heat after passing the heater core 40 and cold air which did not pass the heater core 40 are mixed in a mixing zone (MZ) formed above the evaporator 30 and the heater core 40, and then, are discharged to the interior of the vehicle. In this instance, the reference numeral 60 is a blowing mode converting door mounted between the vent outlet 12 and the floor outlet 13 to rotate around the shaft part 61. The blowing mode converting door 60 closes the vent outlet 12 or the floor outlet 13 or makes air flow to the vent outlet 12 and the floor outlet 13.

Such a conventional rear air conditioner for a vehicle has a disadvantage in that temperature mixability is not good due to differences in cross section area and in passage resistance between the warm air passageway 14b and the cold air passageway 14c. Furthermore, the conventional rear air conditioner for a vehicle has another disadvantage in that the mixing zone (MZ) in the case is small due to a space limit that the rear air conditioner is installed at the rear seat of the vehicle and there is a great temperature difference between the discharged airs. Additionally, the conventional rear air conditioner for a vehicle can keep a distribution amount of the air discharged to the two sides constant since there is resistance in the air passageway structure inside the rear air conditioner, but air volume may be reduced and noise is generated if air distribution is improved by resistance.

SUMMARY OF THE INVENTION

Accordingly, the present invention has been made to solve the above-mentioned problems occurring in the prior arts, and it is an object of the present invention to provide an air conditioner for a vehicle, which can remarkably improve resistance against an air flow in an air passageway, thereby enhancing efficiency.

To accomplish the above object, according to the present invention, there is provided an air conditioner for a vehicle, including: a case having an air inlet, an air outlet, and an air passageway formed therein; a blower unit for blowing air to the air inlet; and an evaporator and a heater core disposed in the air passageway of the case in an air flow direction in order, wherein the air outlet of the case includes a floor outlet and a vent outlet, the floor outlet and the vent outlet are arranged below the heater core in a height direction, and the floor outlet is arranged within a range of the width of the heater core.

The air conditioner for a vehicle according to the present invention can enhance efficiency since air passes through the entire face of the evaporator in the vent mode, and minimize air passage resistance of air and reduce loss of air pressure and air volume since the cold air passing through the evaporator is guided by the second temperature adjusting door and the floor mode door to be directly transferred to the vent outlet and the air passing through the heater core in the heating mode is directly transferred to the floor outlet.

Additionally, the air conditioner for a vehicle according to the present invention can adjust the volume of air to make up for insufficient air volume by adjusting the second temperature adjusting door since various mode doors are disposed in the vicinity of the mixing zones where the air passing through the first cold air passageway, the air passing through the second cold air passageway, and the air passing through the warm air passageway are mixed together.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, technical structure of an air conditioner for a vehicle according to exemplary embodiments of the present invention will be described with reference to the accompanying drawings.

Figure 1:
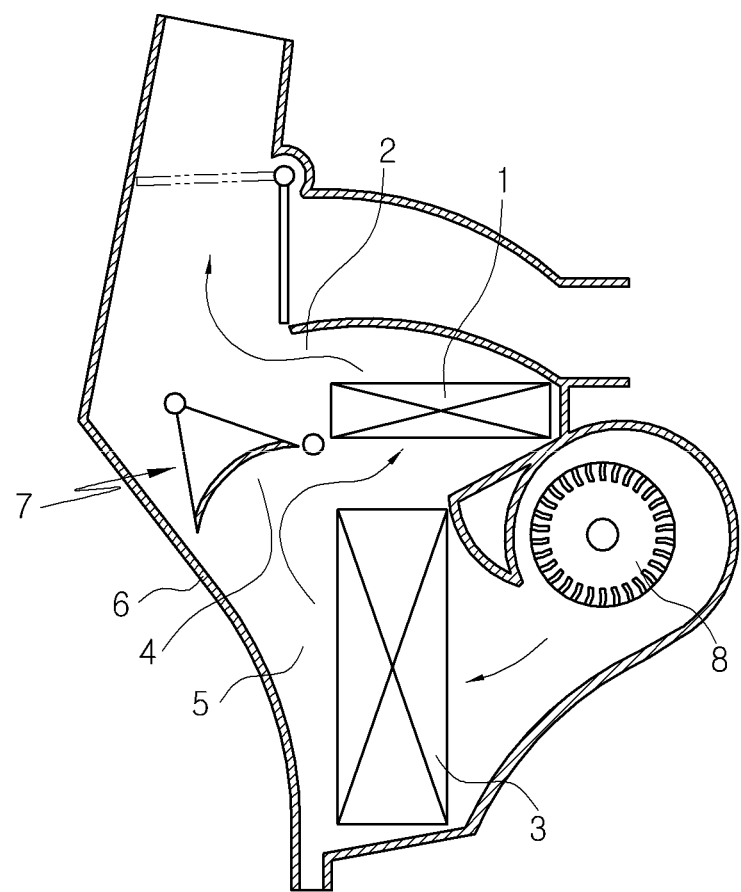
FIG. 1 is a sectional view showing a conventional rear air conditioner for a vehicle.
Figure 2:
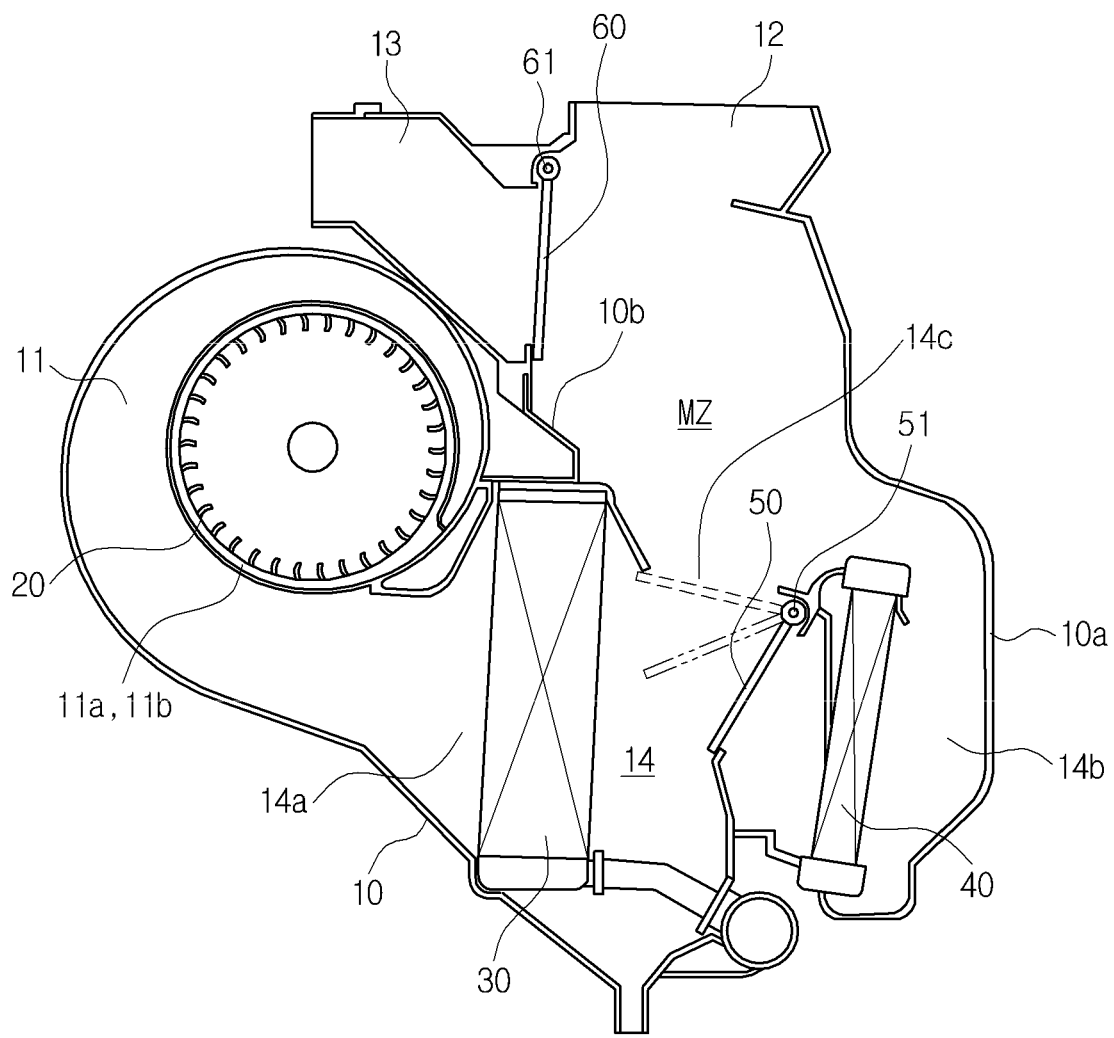
FIG. 2 is a sectional view showing another conventional rear air conditioner for a vehicle.
Figure 3:
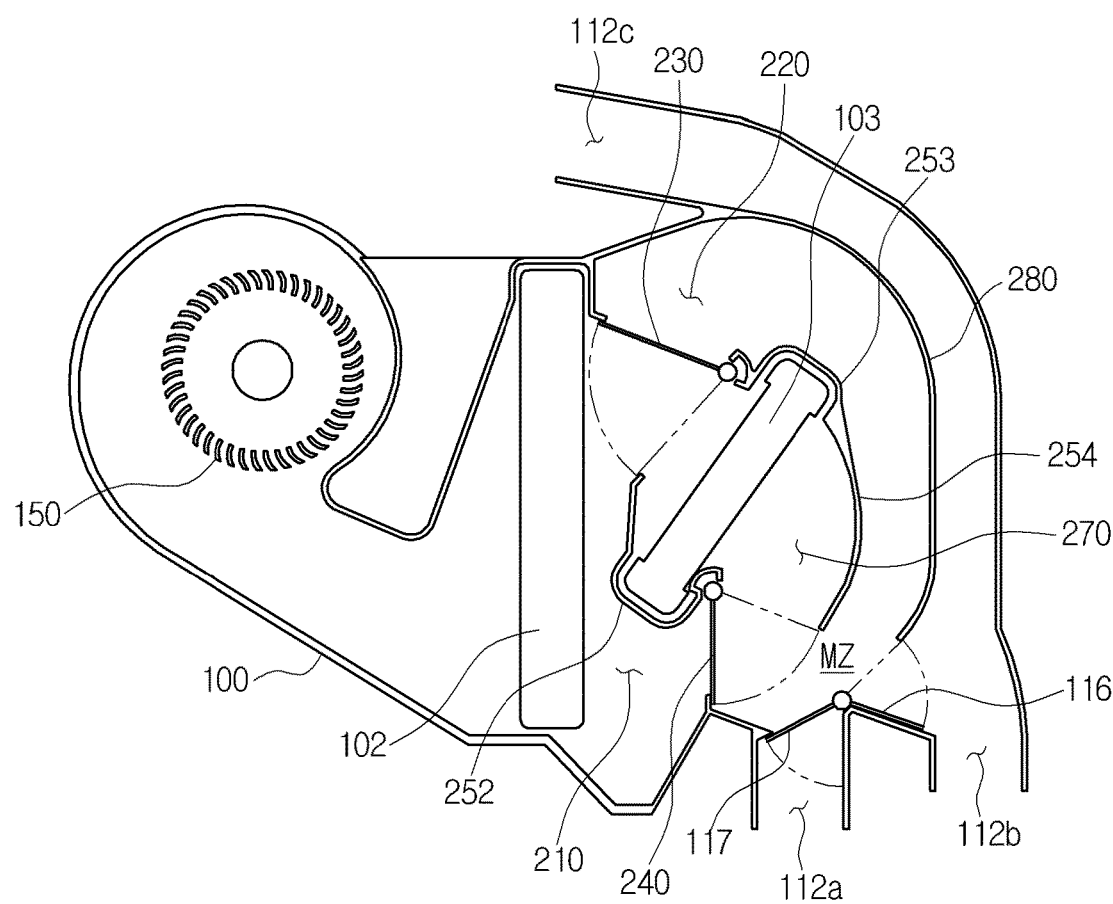
FIG. 3 is a sectional view showing an air conditioner for a vehicle according to a first preferred embodiment of the present invention.

FIG. 3 is a sectional view showing an air conditioner for a vehicle according to a first preferred embodiment of the present invention. As shown in FIG. 3, the air conditioner for a vehicle according to the first preferred embodiment of the present invention includes a case 100, a blower unit 150, an evaporator 102, a heater core 103, a temperature adjusting means, and various mode doors 116 and 117.

The case 100 includes an air inlet formed at one side of the blower unit 150, which is an entrance of the case 100, to introduce air into the case 100, and an air outlet formed at an exit side of the case 100 to discharge air. The air outlet includes a floor outlet 112a and a pair of vent outlets 112b and 112c. The vent outlets include a first vent outlet 112b and a second vent outlet 112c which communicate with each other. The case 100 has an air passageway, and the blower unit 150 is mounted inside the case 100 to forcedly send air to the air inlet of the case 100.

When the air conditioner is installed at a rear seat of the vehicle, one of the vent outlets 112b and 112c is mounted to send air toward the left side of the rear seat of the vehicle and the other is mounted to send air toward the right side of the rear seat. Moreover, the vent outlet may be formed on the contrary to the above, and the rear air conditioner for a vehicle may be changed according to an installation place at the rear seat. It will be described later.

The evaporator 102 and the heater core 103 are mounted in the air passageway of the case 100 in order in an air flow direction. In this embodiment, the evaporator 102 may be an evaporator for exchanging heat between refrigerant and air, and the heater core 103 may be a heater core for exchanging heat between cooling water and air.

The temperature adjusting means adjusts the degree of opening so that the air passing the evaporator 102 selectively flows in the heater core 103. The temperature adjusting means includes a first temperature adjusting door 230 and a second temperature adjusting door 240. Hereinafter, the temperature adjusting means will be described in detail.

The mode doors 116 and 117 for the rear seat are a vent mode door 116 for adjusting the degree of opening of the rear floor outlet 112a and a floor mode door 117 for adjusting the degree of opening of the vent outlets 112b and 112c. The mode doors 116 and 117 adjust the degree of opening of the floor outlet 112a and the vent outlets 112b and 112c according to rotation to control the volume of discharged air. The floor outlet 112 and the first vent outlet 112b are formed to discharge air downwardly, namely, in the direction of gravity, and the second vent outlet 112c is bypassed to discharge air upwardly, but the present invention is not limited to the above.

The air passageway in the case 100 includes a warm air passageway 270 and a second cold air passageway 220. The warm air passageway 270 forms a flow passage through which the air passing through the evaporator 102 passes the heater core 103. The first cold air passageway 210 forms a flow passage through which the air passing through the evaporator 102 bypasses the heater core 103 downwardly. The second cold air passageway 220 is formed to be spaced apart from the first cold air passageway 210, and forms a flow passage through that the air passing through the evaporator 102 bypasses the heater core 103 upwardly.

The air conditioner for a vehicle includes: the first cold air passageway 210 through which the air passing through the evaporator 102 flows upwardly and the second cold air passageway 220 through which the air passing through the evaporator 102 flows downwardly in the air passageway of the case 100. Therefore, the air conditioner for a vehicle can evenly utilize the entire area of the upper and lower portions of the evaporator 102, and can be compact-sized since having a mixing zone where the air passing through the two cold air passageways 210 and 220 and the air passing through the warm air passageway 270 are mixed together.

Moreover, the floor outlet 112*a* discharges air to the floor of the rear seat of the vehicle and mainly needs warm air. The warm air passing through the heater core 103 is guided through the warm air passageway 270 by an extension part 254 and is directly transferred to the floor outlet 112*a*. That is, the extension part 254 is extended from a support partition 253 toward the floor outlet 112*a*, so a warm air flow passage through which the warm air passing through the heater core 103 flows toward the floor outlet 112*a* is formed. The warm air passing through the warm air passageway 270 is guided and discharged to the floor outlet 112*a* in a straight line so as to minimize resistance to the warm air flow passage.

Furthermore, the evaporator 102 and the heater core 103 are spaced on either side of the case 100 and are arranged in parallel with each other. In this instance, the evaporator 102 and the heater core 103 need not be exactly parallel with each other, and it is enough to arrange the evaporator 102 and the heater core 103 nearly parallel with each other. Additionally, the air introduced from the blower unit 150 flows from the left to the right in the drawings, and then, is discharged to the floor outlet 112*a* formed to discharge air downwardly. The evaporator 102 and the heater core 103 are disposed in an air flow direction in order.

Because the evaporator 102 and the heater core 103 are arranged parallel with each other, a back-and-forth width of the vehicle having the case 100 may be reduced. Therefore, the air conditioner for a vehicle according to the present invention is less restrictive in an installation space than other air conditioners. Especially, the air conditioner for a vehicle according to the present invention can secure a great space when being arranged at the rear seat of the vehicle.

The first cold air passageway 210 is disposed between the inner wall of a lower portion of the case 100 and the heater core 103, and the second cold air passageway 220 is disposed between the inner wall of an upper portion of the case 100 and the heater core 103.

A partition wall 252 which makes the air passing through the evaporator 102 flow to the first cold air passageway 210 and the second cold air passageway 220 is formed inside the case 100. The partition wall 252 is formed between the evaporator 102 and the heater core 103 to surround and support one side (lower side) of the heater core 103. In the meantime, the heater core 103 has a support partition 253 for surrounding and supporting the other side (upper side) of the heater core 103, and an extension part 254 extending from the support partition 253.

The temperature adjusting means includes a first temperature adjusting door 230 and a second temperature adjusting door 240. The first temperature adjusting door 230 is disposed above the heater core 103 and between the evaporator 102 and the heater core 103 in order to adjust the degree of opening of an inlet of the warm air passageway 270 and an inlet of the second cold air passageway 220. The second temperature adjusting door 240 is disposed below the heater core 103 to adjust the degree of opening of an outlet of the warm air passageway 270 and an outlet of the first cold air passageway 210.

The first temperature adjusting door 230 is restricted in rotation by the partition wall 252, and the second temperature adjusting door 240 is restricted in rotation by the extension part 254 extending from the support partition 253. A rotary shaft of the first temperature adjusting door 230 is located at an end portion of the support partition 253. The first temperature adjusting door 230 blocks the warm air passageway 270 by touching one end portion of the partition wall 252 when being rotated in the counterclockwise direction to the maximum, and blocks the second cold air passageway 220 by touching a part of the inner wall of the upper portion of the case 100 when being rotated in the clockwise direction to the maximum.

A rotary shaft of the second temperature adjusting door 240 is located at the other end portion of the partition wall 252. The second temperature adjusting door 240 blocks the warm air passageway 270 by touching one end portion of the extension part 254 of the support partition 253 when being rotated in the counterclockwise direction to the maximum, and blocks the first cold air passageway 210 by touching a part of the inner wall of the lower portion of the case 100 when being rotated in the clockwise direction to the maximum.

The first temperature adjusting door 230 and the second temperature adjusting door 240 are arranged at upper and lower portions of the heater core 103 to control the degrees of opening of the warm air passageway and the two cold air passageway, thereby enhancing reliability in control of temperature by accurately controlling mixing of cold air and warm air.

The partition wall 252 surrounds and supports the heater core 103 and partitions the first cold air passageway 210 and the second cold air passageway 220. The air flowing toward the second cold air passageway 220 among the airs divided by the partition wall 252 is introduced into the second cold air passageway 220 and the warm air passageway 270 by the first temperature adjusting door 230 and flows to the mixing zone (MZ) along the extension part 254, and the air flowing toward the first cold air passageway 210 flows to the mixing zone (MZ) after going by the second temperature adjusting door 240. All of the airs passing through the first cold air passageway 210, the second cold air passageway 220 and the warm air passageway 270 are mixed in the mixing zone (MZ).

The air mixed in the mixing zone (MZ) is discharged to the floor of the rear seat of the vehicle through the floor outlet 112*a* or discharged to the rear seat through the vent outlets 112*b* and 112*c*.

The floor outlet 112*a* and the first vent outlet 112*b* are formed to be arranged close to each other toward the lower portion of the case 100 in the vicinity of the mixing zone, and the second vent outlet 112*c* is formed to pass through the case 100 and a partition wall 280 and face upwards. In this instance, the partition wall 280 is spaced apart from the support partition 253 and the extension part 254 to divide the air flowing through the second cold air passageway 220 and the air flowing through the second vent outlet 112c.

A floor mode door 117 for adjusting the degree of opening of the floor outlet 112a and a vent mode door 116 for adjusting the degree of opening of the vent outlets 112b and 112c are disposed at one side of the floor outlet 112a. The vent mode door 116 and the floor mode door 117 are arranged at a position where the floor outlet 112a and the first vent outlet 112b face each other in order to adjust air volume by guiding cold air to the first vent outlet 112b and guiding warm air to the floor outlet 112a by the second temperature adjusting door 240 and the floor mode door 117.

The second temperature adjusting door 240 guides warm air to be discharged to the floor outlet 112a in a straight line and guide cold air to be discharged to the vent outlets 112b and 112c in a straight line.

Because the second vent outlet 112c is formed at an end portion of the passageway extending along the outer wall of the case 100 and the partition wall 280, the air discharged to the second vent outlet 112c is lower in pneumatic pressure than the air discharged to the first vent outlet 112b. That is, the air discharged to the first vent outlet 112b is higher in pressure than the air discharged to the second vent outlet 112c.

If the air conditioner for a vehicle according to the present invention is installed at the right of the rear seat of the vehicle, because the air discharged to the left of the rear seat becomes lower in pneumatic pressure, the first vent outlet 112b which discharges air with pneumatic pressure higher than the second vent outlet 112c may be mounted at the left.

Moreover, when the first temperature adjusting door 230 opens the second cold air passageway 220 and the warm air passageway 270 and the second temperature adjusting door 240 opens the first cold air passageway 210, the air passing through the first cold air passageway 210 and the second cold air passageway 220 and the air passing through the warm air passageway 270 are mixed in the mixing zone (MZ), and it will be described later referring to FIG. 6.

In this instance, the air passing through the second cold air passageway 220 faces the mixing zone (MZ) among the support partition 253, the extension part 254 and the partition wall 280. That is, the floor outlet 112a is formed at the lower portion of the case 100 in the vicinity of the mixing zone (MZ), and the air passing through the heater core 103 is guided downwards through the extension part 254, and then, is directly discharged to the floor outlet 112a without any loss of air volume and air pressure.

The extension part 254 is extended downwardly from an end portion of the support partition 253 supporting one side of the heater core 103 and guides the air passing through the warm air passageway 270 to the mixing zone (MZ). Furthermore, the partition wall 280 is formed to be spaced apart from the extension part 254 at a predetermined interval and guides the air passing through the second cold air passageway 220 to the mixing zone (MZ). In the same manner, the air passing through the first cold air passageway 210 formed between the partition wall 252 and the case 100 directly flows to the mixing zone (MZ).

Figure 4:
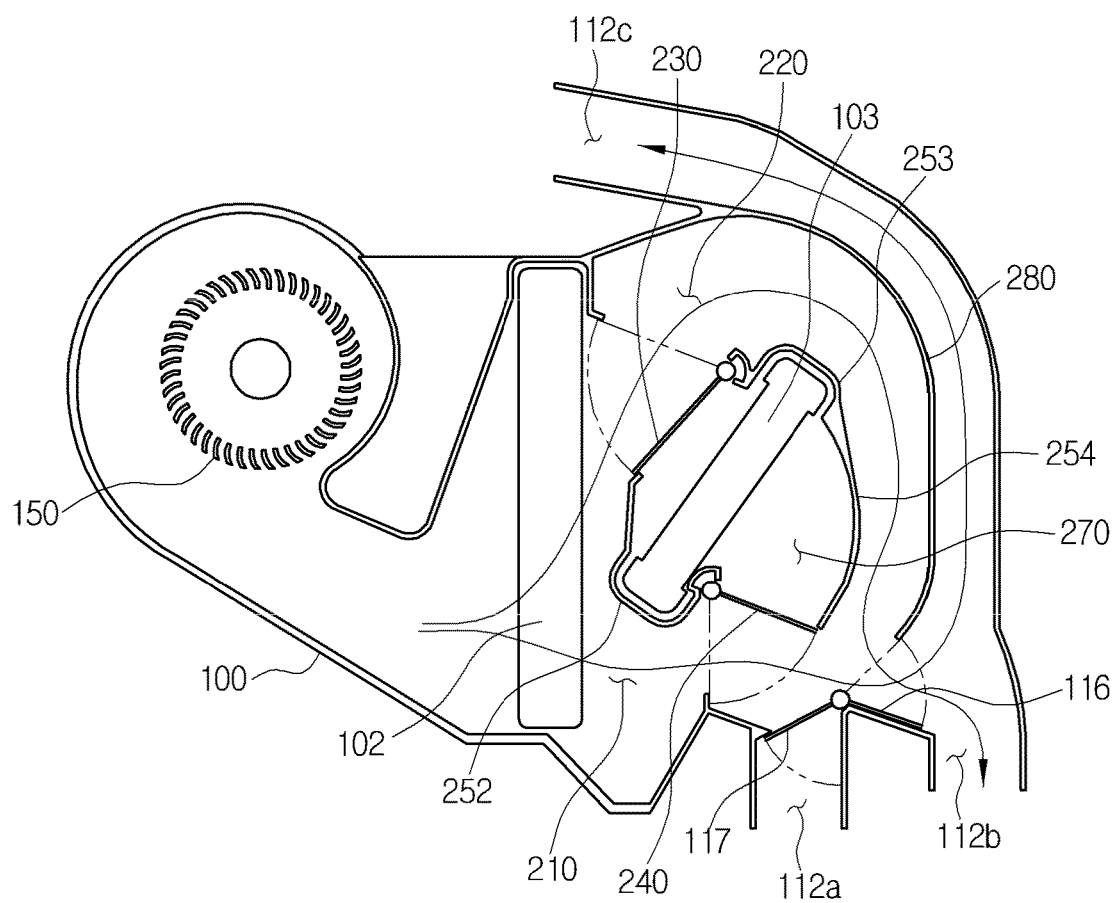
FIG. 4 is a sectional view showing a vent mode of the air conditioner for a vehicle according to the first preferred embodiment of the present invention.

FIG. 4 is a sectional view showing a vent mode of the air conditioner for a vehicle according to the first preferred embodiment of the present invention.

As shown in FIG. 4, the first temperature adjusting door 230 closes the warm air passageway 270 and opens the second cold air passageway 220, and the second temperature adjusting door 240 opens the first cold air passageway 210. Additionally, the floor mode door 117 closes the floor outlet 112a, and the vent mode door 116 opens the vent outlets 112b and 112c. The air introduced through the blower unit 150 is cooled while passing through the evaporator 102, passes through the first cold air passageway 210 and the second cold air passageway 220, and then, is discharged to the interior of the vehicle through the vent outlets 112b and 112c.

In the vent mode, because the air introduced through the blower unit 150 flows into the first cold air passageway 210 formed at the lower portion of the case 100 and the second cold air passageway 220 formed at the upper portion of the case 100, the air passes the entire face of the evaporator 102 to show the optimum performance of the evaporator 102. That is, the present invention can solve the problem of the conventional rear air conditioner for a vehicle that cooling performance is deteriorated since a part of the evaporator 102 is closed and the air is concentrated to another part of the evaporator.

In addition, because the cold air passing through the first cold air passageway 210 is transferred to the first vent outlet 112b in a straight line by the second temperature adjusting door 240 closing the warm air passageway 270 and the floor mode door 117 closing the floor outlet 112a, the air conditioner for a vehicle according to the present invention can reduce loss of air pressure and air volume.

Figure 5:
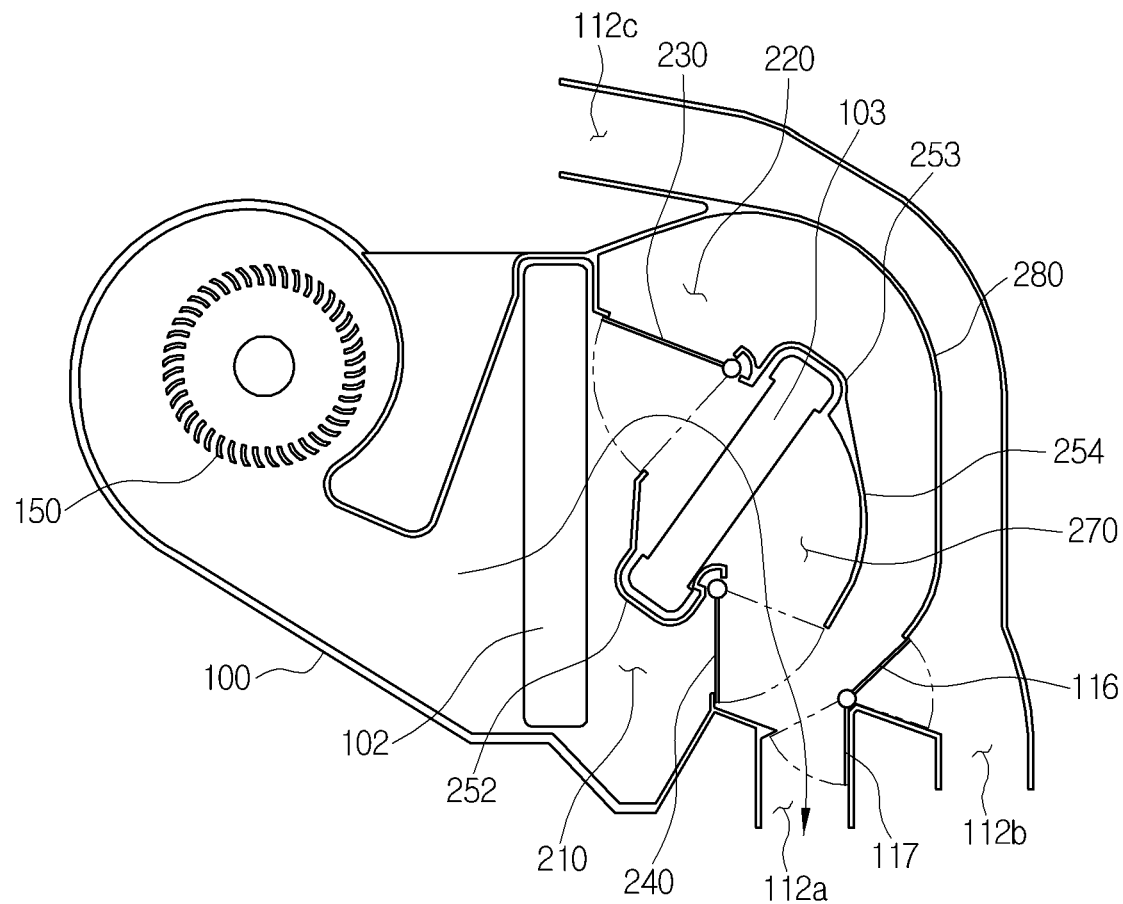
FIG. 5 is a sectional view showing a heating mode of the air conditioner for a vehicle according to the first preferred embodiment of the present invention.

FIG. 5 is a sectional view showing a heating mode of the air conditioner for a vehicle according to the first preferred embodiment of the present invention.

Referring to FIG. 5, in the heating mode, the first temperature adjusting door 230 opens the warm air passageway 270 and closes the second cold air passageway 220, and the second temperature adjusting door 240 closes the first cold air passageway 210. Moreover, the vent mode door 116 closes the vent outlets 112b and 112c and the floor mode door 117 opens the floor outlet 112a. The air introduced through the blower unit 150 is heated while passing through the heater core 103, and then, is discharged to the interior of the vehicle through the floor outlet 112a.

In this instance, the air introduced through the blower unit 150 passes through the warm air passageway 270 after passing the heater core 103, and passes through the floor outlet 112a in the straight line in order to show the optimum performance without loss of air volume. That is, the warm air passing through the warm air passageway 270 is guided by the extension part 254 facing the floor outlet 112a and the second temperature adjusting door 240 closing the first cold air passageway 210 to be directly transferred to the floor outlet 112a. So, the air conditioner for a vehicle according to the present invention can minimize air passage resistance of air and reduce loss of air pressure and air volume.

Figure 6:
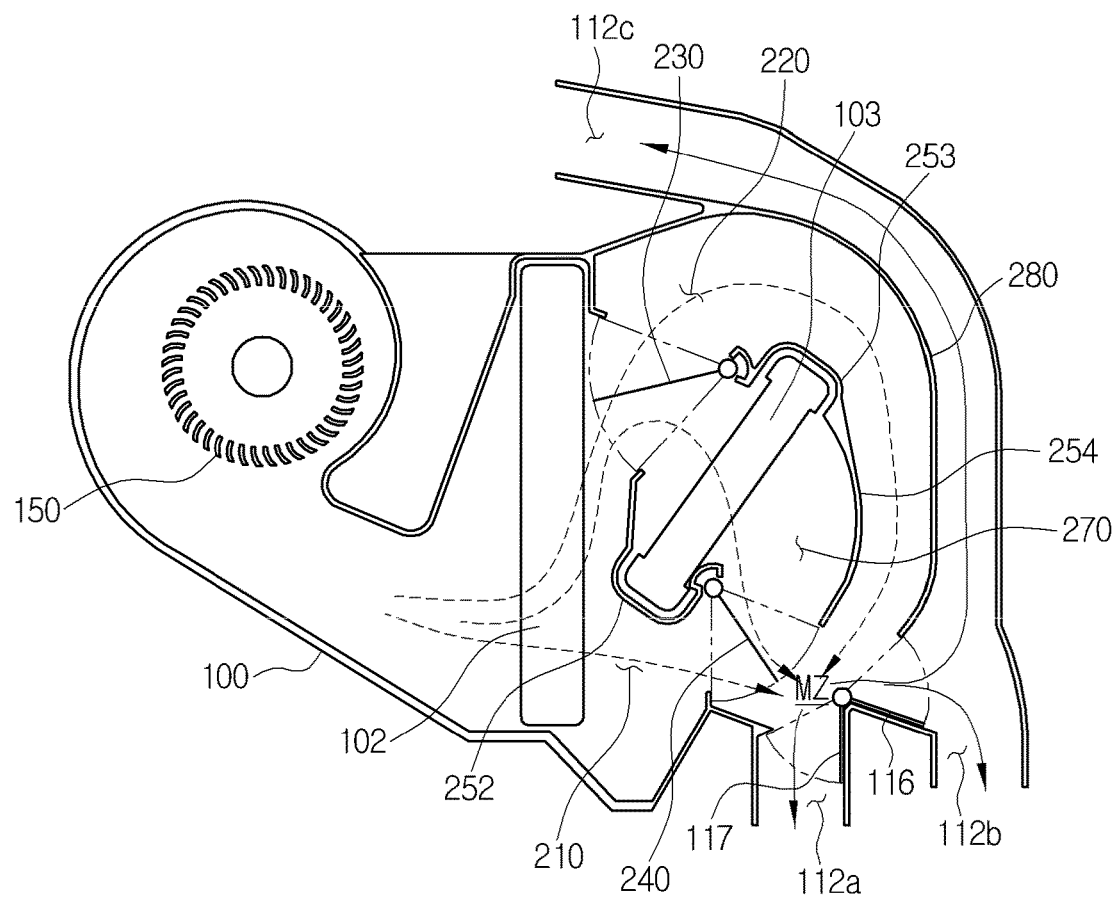
FIG. 6 is a sectional view showing a mixing mode of the air conditioner for a vehicle according to the first preferred embodiment of the present invention.

FIG. 6 is a sectional view showing a mixing mode of the air conditioner for a vehicle according to the first preferred embodiment of the present invention.

As shown in FIG. 6, in the mixing mode, the first temperature adjusting door 230 opens all of the second cold air passageway 220 and the warm air passageway 270, and the second temperature adjusting door 240 opens the first cold air passageway 210. Furthermore, the vent mode door 116 and the floor mode door 117 open all of the floor outlet 112a and the vent outlets 112b and 112c. The air introduced through the blower unit 150 is cooled while passing through the evaporator 102, and some of the cooled air is heated while passing through the heater core 103, and then, is mixed in two mixing zones (MZ). After that, the air is discharged to the interior of the vehicle through the floor outlet 112a and the vent outlets 112b and 112c.

In FIG. 6, the mixing zone is a place where all of the air of the first cold air passageway 210, the air of the second cold air passageway 220 and the air of the warm air passageway 270 are mixed together. The mode doors 116 and 117 are located in the vicinity of the mixing zone (MZ), and the floor outlet 112a and the first vent outlet 112b are directly connected to the mixing zone (MZ).

Additionally, the air conditioner for a vehicle according to the present invention can accurately adjust temperature by the two temperature adjusting doors 230 and 240. For instance, the second temperature adjusting door 240 can adjust the volume of air flowing to the floor outlet 112a. That is, the two temperature adjusting doors 230 and 240 can adjust the volume of air to make up for insufficient air volume.

Figure 7:
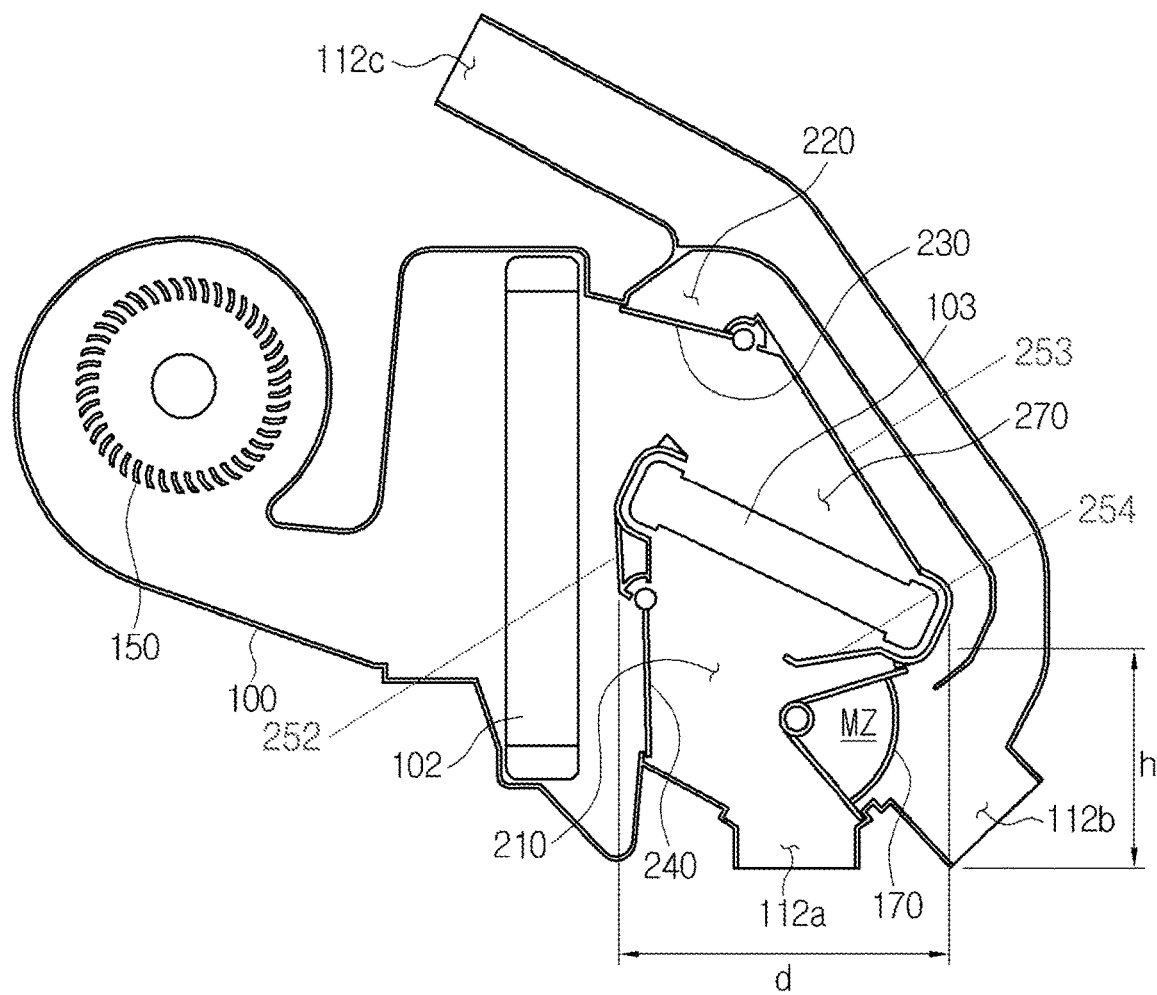
FIG. 7 is a sectional view showing an air conditioner for a vehicle according to a second preferred embodiment of the present invention.

FIG. 7 is a sectional view showing an air conditioner for a vehicle according to a second preferred embodiment of the present invention.

As shown in FIG. 7, the air conditioner for a vehicle according to the second preferred embodiment of the present invention includes a case 100, a blower unit 150, an evaporator 102, a heater core 103, a first temperature adjusting door 230, a second temperature adjusting door 240, and a mode door 170.

An air outlet of the case 100 includes a floor outlet 112a, a first vent outlet 112b, and a second vent outlet 112c. The floor outlet 112a and the first vent outlet 112b are arranged below the heater core 103 in a height direction (h). Moreover, the floor outlet 112a is arranged within a range of the width (d) of the heater core 103. The first vent outlet 112b discharges air to the right in a width direction of the vehicle, and the second vent outlet 112c discharges air to the left.

Because the floor outlet 112a and the first vent outlet 112b are arranged below the heater core 103, a conventional return passage for guiding the air passing through the heater core 103 to face upwards may be omitted, so the width of the air conditioner can be reduced to be compact-sized. Furthermore, because the floor outlet 112a is arranged within the range of the width (d) of the heater core 103, the air conditioner can be reduced in size and reduce thermal loss and maximize heating effect by minimizing a distance between the heater core 103 and the floor outlet 112a.

The case 100 includes a warm air passageway 270, a first cold air passageway 210 and a second cold air passageway 220. The warm air passageway 270 forms a flow passage in such a way that the air passing through the evaporator 102 passes through the heater core 103. The first cold air passageway 210 forms a flow passage in such a way that the air passing through the evaporator 102 bypasses the heater core 103 downwardly, and the second cold air passageway 220 forms a flow passage in such a way that the air passing through the evaporator 102 bypasses the heater core 103 upwardly.

The first temperature adjusting door 230 is arranged between the evaporator 102 and the heater core 103 to close an inflow passageway of the heater core 103 and a communication passageway of the mode door 170. The second temperature adjusting door 240 is arranged downstream the heater core 103 to separately guide an outflow passageway of the heater core 103 and an outflow passageway of the evaporator 102.

The warm air passageway 270 is closed at an inflow position by the first temperature adjusting door 230, and is closed at an outflow position by the second temperature adjusting door 240. Furthermore, the first cold air passageway 210 is closed by the second temperature adjusting door 240, directly communicates with the mode door 170, and is closed by the first temperature adjusting door 230.

The mode door 170 is rotatably disposed between the floor outlet 112a and the first vent outlet 112b to adjust the degrees of opening of the floor outlet 112a and the first vent outlet 112b. The mode door 170 is a rotary door of a dome shape.

The second cold air passageway 220, the warm air passageway 270, and the first cold air passageway 210 are formed downwardly in order. The passageways meet in mixing zones (MZ). The mixing zones (MZ) are zones where the air passing through the warm air passageway 270, the air passing through the first cold air passageway 210, and the air passing through the second cold air passageway 220 are mixed together, and are formed at the floor outlet 112a and at the first vent outlet 112b.

The mixing zones (MZ) are formed inside the rotary type mode door 170. That is, the mode door 170 is the dome shape that the inner face is streamlined concavely, and the floor outlet 112a is completely closed in a state where the mode door 170 is fully rotated in the clockwise direction. In the state where the mode door 170 completely closes the floor outlet 112a, the inner face of the dome-shaped part faces an outlet of the warm air passageway 270 located above.

In addition, in a state where the mode door 170 is fully rotated in the counterclockwise direction, as shown in FIG. 7, the flow passage facing the first vent outlet 112b and the second vent outlet 112c is completely closed. In the state where the flow passage facing the first vent outlet 112b and the second vent outlet 112c is completely closed, the inner face of the dome-shaped part faces the first cold air passageway 210 located at the left, and the outer face of the dome-shaped part faces an outlet of the second cold air passageway 220. In this instance, when the mode door 170 completely closes the first vent outlet 112b, the second cold air passageway 220 communicates with the first vent outlet 112b.

Figure 8:
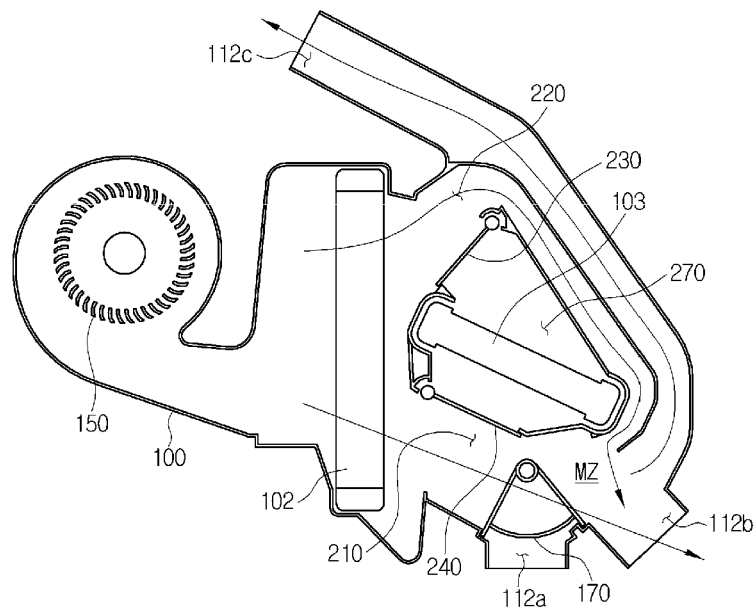
FIG. 8 is a view showing a cooling mode of the air conditioner for a vehicle according to the second preferred embodiment of the present invention.

FIG. 8 is a view showing a cooling mode of the air conditioner for a vehicle according to the second preferred embodiment of the present invention. Referring to FIG. 8, in the cooling mode, the first temperature adjusting door 230 closes the inlet of the warm air passageway 270 and opens the second cold air passageway 220. The second temperature adjusting door 240 closes the outlet of the warm air passageway 270 and opens the first cold air passageway 210. The mode door 170 closes the floor outlet 112a and opens the flow passage facing the first vent outlet 112b and the second vent outlet 112c.

The air is cooled while passing through the evaporator 102, some of the air is blown to the first vent outlet 112b and the second vent outlet 112c through the first cold air passageway 210, and the rest of the air is blown to the first vent outlet 112b and the second vent outlet 112c through the second cold air passageway 220. In this instance, the air blown from the blower unit 150 moves to the first vent outlet 112b through the first cold air passageway 210 in a straight line. Therefore, the air conditioner for a vehicle according to the present invention can enhance cooling performance and increase air volume by discharging cold air cooled by the evaporator 102 to the vent outlets at the smallest distance.

Figure 9:
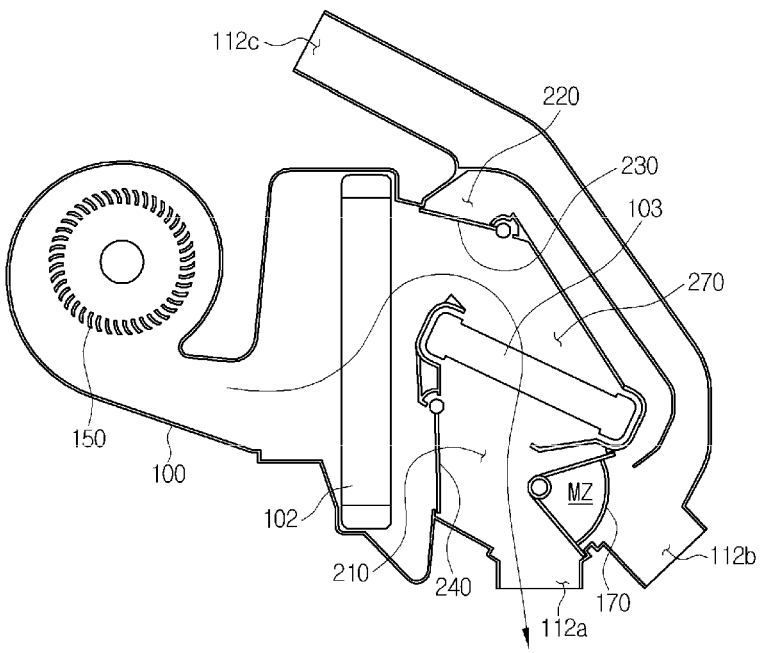
FIG. 9 is a view showing a heating mode of the air conditioner for a vehicle according to the second preferred embodiment of the present invention.

FIG. 9 is a view showing a heating mode of the air conditioner for a vehicle according to the second preferred embodiment of the present invention. Referring to FIG. 9, in the heating mode, the first temperature adjusting door 230 opens the inlet of the warm air passageway 270 and closes the second cold air passageway 220. The second temperature adjusting door 240 opens the outlet of the warm air passageway 270 and closes the first cold air passageway 210.

The mode door 170 opens the floor outlet 112a and closes the flow passage facing the first vent outlet 112b and the second vent outlet 112c.

The air passing through the evaporator 102 is heated while passing through the heater core 103, and then, is blown to the floor outlet 112a through the warm air passageway 270. The warm air passing through the heater core 103 is directly discharged to the floor outlet 112a located directly below the heater core 103 within the range of the width of the heater core 103. Therefore, the air conditioner for a vehicle according to the present invention can reduce thermal loss and maximize heating effect by minimizing the distance between the heater core 103 and the floor outlet 112a.

Figure 10:
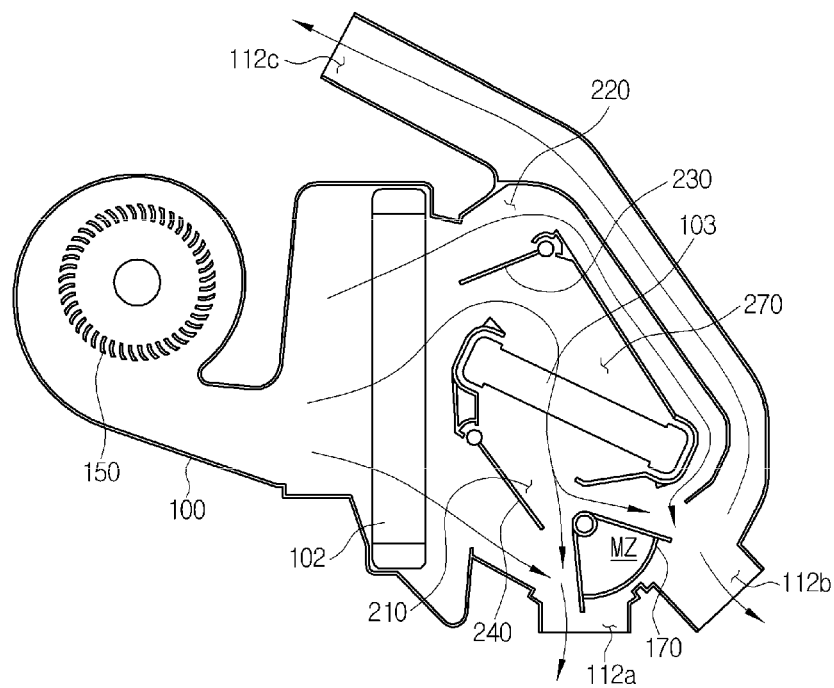
FIG. 10 is a view showing a mixing mode of the air conditioner for a vehicle according to the second preferred embodiment of the present invention.
Figure 11:
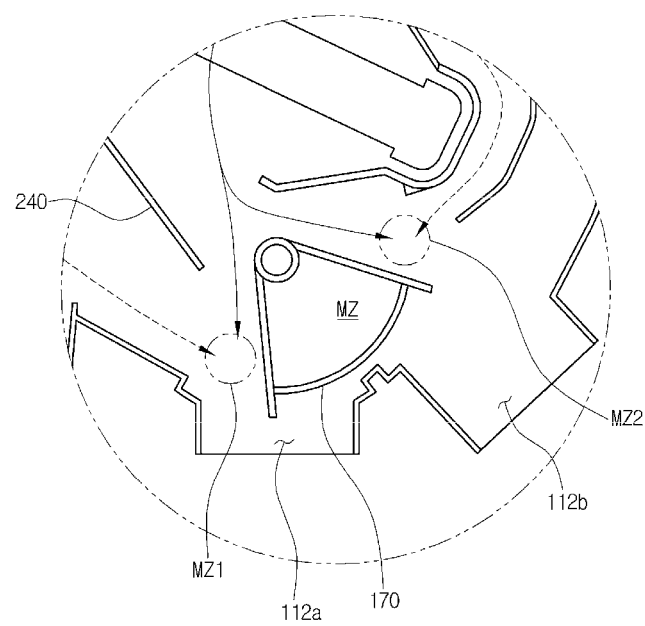
FIG. 11 is a partially enlarged view of FIG. 10.

FIG. 10 is a view showing a mixing mode of the air conditioner for a vehicle according to the second preferred embodiment of the present invention, and FIG. 11 is a partially enlarged view of FIG. 10. Referring to FIGS. 10 and 11, the first temperature adjusting door 230 opens all of the inlet of the warm air passageway 270 and the second cold air passageway 220. The second temperature adjusting door 240 opens all of the outlet of the warm air passageway 270 and the first cold air passageway 210. The mode door 170 opens all of the flow passages facing the floor outlet 112a, the first vent outlet 112b and the second vent outlet 112c.

The air is cooled while passing through the evaporator 102. After that, some of the air is blown to the mixing zone (MZ) through the first cold air passageway 210, and some of the air is blown to the mixing zone (MZ) through the second cold air passageway 220. Moreover, the rest of the air passing through the evaporator 102 is heated while passing through the heater core 103, and then, is blown to the mixing zone (MZ) through the warm air passageway 270.

In this instance, as shown in FIG. 11, the air passing through the warm air passageway 270, the air passing through the first cold air passageway 210 and the air passing through the second cold air passageway 220 meet in the mixing zone (MZ), and form a first mixing zone (MZ1) at the floor outlet 112a and a second mixing zone (MZ2) at the first vent outlet 112b. As described above, the two mixing zones are formed since a mixing space is formed inside the rotary type mode door 170. Finally, the air conditioner for a vehicle according to the present invention can enhance mixability of warm air and cold air and temperature performance of discharged air to increase passengers' satisfaction. Furthermore, the air conditioner for a vehicle according to the present invention can enhance temperature performance through optimization of the flow passages and optimization in shape of the mode door without increase of the entire size of the air conditioner.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

What is claimed is:

1. An air conditioner for a vehicle comprising:
    a case having an air inlet, an air outlet, and an air passageway formed therein;
    a blower unit for blowing air to the air inlet;
    a cooling means and a heating means disposed in the air passageway of the case in an air flow direction in order, wherein the air outlet of the case includes a floor outlet and vent outlets,
    wherein the floor outlet and at least one of the vent outlets are arranged below the heating means in a height direction, and wherein the floor outlet is arranged within a range of the width of the heating means; and
    a mode door rotatably disposed between the floor outlet and the vent outlets to adjust the degrees of opening of the floor outlet and the vent outlets, and the mode door being formed in a rotary door type of a dome shape.

2. The air conditioner according to claim 1, further comprising:
    a first temperature adjusting door arranged between the cooling means and the heating means; and
    a second temperature adjusting door arranged downstream the heating means,
    wherein the first temperature adjusting door closes an inflow passageway of the heating means and a communication passageway of the mode door, and
    wherein the second temperature adjusting door guides an outflow passageway of the heating means and an outflow passageway of the cooling mean.

3. The air conditioner according to claim 2, further comprising:
    a warm air passageway forming a flow passage in such a way that the air passing through the cooling means passes through the heating means;
    a first cold air passageway making the air passing through the cooling means bypass the heating means upwardly; and
    a second cold air passageway making the air passing through the cooling means by pass the heating means downwardly,
    wherein mixing zone where the air passing through the warm air passageway, the air passing through the first cold air passageway and the air passing through the second cold air passageway are mixed together are formed at the floor outlet and at the vent outlets.

4. The air conditioner according to claim 3, wherein the mixing zone are formed inside the rotary type mode door.

5. The air conditioner according to claim 3, wherein the warm air passageway is opened and closed at an inflow position by the first temperature adjusting door and is opened and closed at an outflow position by the second temperature adjusting door,
    wherein the first cold air passageway is opened and closed by the second temperature adjusting door, and
    wherein the second cold air passageway is directly communicated with the mode door and is opened and closed by the first temperature adjusting door.

6. The air conditioner according to claim 3, wherein the second cold air passageway is communicated with the vent outlets when the mode door completely closes the vent outlets.

* * * * *